US006772202B2

(12) United States Patent
Wright

(10) Patent No.: US 6,772,202 B2
(45) Date of Patent: Aug. 3, 2004

(54) QUEUING SYSTEM, METHOD AND COMPUTER PROGRAM PRODUCT FOR NETWORK DATA TRANSFER

(75) Inventor: David D. Wright, Costa Mesa, CA (US)

(73) Assignee: GameSpy Industries, Inc., Irvine, CA (US)

( * ) Notice: Subject to any disclaimer, the term of this patent is extended or adjusted under 35 U.S.C. 154(b) by 238 days.

(21) Appl. No.: 09/994,849

(22) Filed: Nov. 28, 2001

(65) Prior Publication Data

US 2003/0101213 A1 May 29, 2003

(51) Int. Cl.[7] .............................................. G06F 15/16
(52) U.S. Cl. ...................... 709/219; 709/217; 709/225; 709/229
(58) Field of Search ................................. 709/219, 217, 709/225, 229, 232, 105; 370/352, 389

(56) References Cited

U.S. PATENT DOCUMENTS

| 5,579,384 A | 11/1996 | Seymour |
| 5,623,603 A | 4/1997 | Jiang et al. |
| 5,946,498 A | 8/1999 | Chiang et al. |
| 6,005,850 A | 12/1999 | Moura et al. |
| 6,023,681 A | 2/2000 | Whitt |

(List continued on next page.)

FOREIGN PATENT DOCUMENTS

| DE | 19923958 | 12/1999 | |
| EP | 466467 A2 * | 1/1992 | ........... G06F/13/14 |
| EP | 0793397 | 9/1997 | |
| EP | 1081930 | 3/2001 | |

OTHER PUBLICATIONS

"Other Electronic Document Delivery Tools (Publishing on the Internet)," Seybold Report on Publishing Systems, v.24, n.17, pS20(8), May 1, 1995, published by Seybold Seminars and Publications.
"Managing Documents and Workflow, Text/Image Retrieval," Seybold Report on Publishing systems, v.22, n.17, pS23(12), May 31, 1993, published by Seybold Seminars and Publications.
M. Dewolf, "Exploiting the 3270 Connection (Writing Microcomputer Applications that Connect Directly with Mainframes through 3270 Communication Channels)," PCT Tech Journal, v5., n.7, p. 94(8), Jul., 1987.

(List continued on next page.)

Primary Examiner—Glenton B. Burgess
Assistant Examiner—Bradley Edelman
(74) Attorney, Agent, or Firm—Sterne Kessler Goldstein & Fox P.L.L.C.

(57) ABSTRACT

A queuing system, method and computer program product is provided for transferring electronic information over a data network, such as the Internet. A host or system administrator monitors host resources by preventing one or more host resource limits from being exceeded. Where a resource limit is reached, a queuing protocol is initiated with a client requesting data. The queuing protocol permits the client to enter a queue and wait until host resources may be allocated to service the data request. The queue is maintained by the host, which may provide periodic updates to the client regarding queue length, position and estimated wait time. Clients may advance through the queue in accordance with a first-in-first-out algorithm, or some alternative priority scheme. When a client reaches the head of the queue, host resources are checked. If sufficient resources are available to service the client request, they are allocated to the client at the head of the queue.

34 Claims, 10 Drawing Sheets

U.S. PATENT DOCUMENTS

| | | | |
|---|---|---|---|
| 6,157,655 A | | 12/2000 | Shtivelman |
| 6,184,996 B1 | * | 2/2001 | Gase .......................... 358/1.15 |
| 6,332,161 B1 | | 12/2001 | Sasson |
| 6,360,270 B1 | * | 3/2002 | Cherkasova et al. ........ 709/229 |
| 6,389,028 B1 | | 5/2002 | Bondarenko et al. |
| 6,408,277 B1 | | 6/2002 | Nelken |
| 6,438,630 B1 | | 8/2002 | DeMoney |
| 6,442,550 B1 | | 8/2002 | Rajamony |
| 6,490,249 B1 | * | 12/2002 | Aboul-Magd et al. ...... 370/232 |
| 6,563,921 B1 | * | 5/2003 | Williams et al. ....... 379/226.01 |
| 6,567,416 B1 | * | 5/2003 | Chuah ........................ 370/418 |
| 6,597,919 B1 | * | 7/2003 | Kumar et al. ............... 455/510 |
| 2002/0023168 A1 | | 2/2002 | Bass et al. |
| 2002/0073158 A1 | | 6/2002 | Dalal et al. |
| 2002/0087648 A1 | | 7/2002 | Petrovykh |
| 2002/0091783 A1 | | 7/2002 | Garland et al. |
| 2002/0097716 A1 | * | 7/2002 | Kumaran et al. ........... 370/389 |
| 2002/0105957 A1 | | 8/2002 | Bondarenko et al. |
| 2002/0107965 A1 | | 8/2002 | Piccionelli |
| 2002/0138613 A1 | * | 9/2002 | Garg et al. ................. 709/225 |

OTHER PUBLICATIONS

J. Mann, "Message–Oriented Middleware," Network Computing, n.51, p.72, 1994, published by CMP United Business Media.

English Abstract of German Patent No. DE19923958, published Dec. 2, 1999, printed from esp@net, 1 page.

English Abstract of European Patent No. 07933797, published Sep. 3, 1997, printed from esp@cenet, 1 page.

English Abstract of European Patent No. 1081930, published Mar. 7, 2001, printed from esp@net, 1 page.

* cited by examiner

QUEUING SYSTEM, METHOD AND COMPUTER PROGRAM PRODUCT FOR NETWORK DATA TRANSFER

BACKGROUND OF THE INVENTION

1. Field of the Invention

The present invention relates generally to data networks. More specifically, the present invention relates to protocols for transferring electronic information across data networks.

2. Background

The ability to effectively transfer electronic information over a data network is often highly dependent on the amount of resources available to the host that provides the information. For example, in the area of Internet content delivery, the ability of a network server to provide data (such as files, e-mail and streaming media) to a large number of clients can be affected by the resource limitations of the host on which the server resides. Such resource limitations typically include, but are not limited to, network bandwidth, host processing power or CPU, available memory, file and/or socket descriptors, and disk input/output bandwidth. As the number of clients requesting files or other content from a particular server increases, one or more of these resources may eventually become exhausted.

It has been observed that host machines that provide content over the Internet often experience short but critical "peak" usage periods after new content is released during which a large number of users simultaneously attempt to download content from the host. Often, there is no way to make enough resources available to the host to service the numerous data requests received during those peak periods. Accordingly, it is desirable that the host be able to with resource exhaustion in a manner that is as pleasing as possible to network users requesting content.

Conventional network servers typically exhibit one or more of the following behaviors as their resources near exhaustion: (1) additional clients are completely denied access, either with a standard error message/protocol or simply through the inability to complete a transaction; (2) additional clients are served, but the performance for all clients accessing the host degrades, often creating a "snowball" effect whereby performance eventually reaches zero for all clients as resources are completely exhausted; and/or (3) the host is shut down or "crashes" because a key resource is exhausted. These behaviors are undesirable for client users as well as for hosts, and often impair the ability of any user to receive content during peak demand periods. This impairment is exacerbated by the fact that conventional clients, such as conventional Web browsers, are programmed to continually retry their requests, which simply puts additional strain on the network server and can lead to further resource exhaustion.

Additionally, as host resources are exhausted, the allocation of resources for servicing client requests by conventional servers essentially becomes random. In particular, when a host's resources are exhausted, clients are denied access to the host. As mentioned above, when clients are denied access to the host, they will often continually retransmit their requests. As host resources become available, a conventional server will provide them to the first client request that is received, irrespective of how long the client that made the request has been attempting to access the host. As a result, resource allocation becomes random and clients have no guarantee when they will be able to complete their request. In fact, clients accessing the host for the first time may receive requested data prior to clients that have been requesting service for a longer period of time. This randomness can lead to frustration on the part of users requesting content.

Finally, conventional network servers are typically incapable of determining the number of users that have attempted to access the host for content but have failed due to resource exhaustion. Although the exhibition of one or more of the above-described behaviors may inform a system administrator that the resources of the host are at or near exhaustion, those behaviors do not provide a system administrator with any indication of just how many clients are trying but failing to access the host at any given point in time. Such information may be useful for gauging necessary host resource levels and performing load balancing functions between multiple network servers.

What is desired, then, is a system and method for transferring data over a network that permits a host or system administrator to monitor and limit host resources such that numerous client data requests may be serviced without completely exhausting one or more host resources. The desired system and method should also handle resource limitations in a way that is as pleasing as possible to users that are waiting for requested data. Furthermore, the desired system and method should permit a host or system administrator to determine the number of clients that are currently waiting for data from the host.

BRIEF SUMMARY OF THE INVENTION

The present invention is directed to a queuing system, method and computer program product for transferring data over a network. In embodiments of the present invention, a host receives a request for data, such as a file of digital information, from a client and determines if sufficient resources are available to service the request. If sufficient resources are available to service the request, the host provides the data to the client. However, if sufficient resources are not available to service the request, the host sends a message regarding a queue to the client, receives a request to enter the queue from the client, places the client in the queue in response to receiving the request to enter the queue, and provides the requested data to the client when the client reaches the front of the queue and sufficient resources are available to service the request.

In further embodiments of the present invention, a host or a system administrator ascertains the availability of at least one host resource, such as network bandwidth, processing power, memory, file descriptors, socket descriptors, or disk input/output bandwidth, and sets a resource limit based on the availability of the at least one host resource. The host then determines if sufficient resources are available to service a client data request by determining if the resource limit has been reached. In embodiments, the resource limit is a limit on the total number of client connections for downloading data.

In still further embodiments of the present invention, the host provides queue information to the client requesting data, either before the client has entered the queue or as part of periodic messages to the client while the client waits in the queue. The queue information may include a length of the queue, an anticipated or current position of the client in the queue, and/or an estimated wait time in the queue.

The invention is advantageous in that it permits a host or system administrator to monitor and limit host resources such that numerous client data requests may be serviced without completely exhausting one or more host resources.

The invention is also advantageous in that it permits host resource limitations to be handled in a way that is as pleasing as possible to users that are waiting for requested data.

The invention is further advantageous in that it permits a host or system administrator to accurately determine the number of clients that are currently waiting for data from the host.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
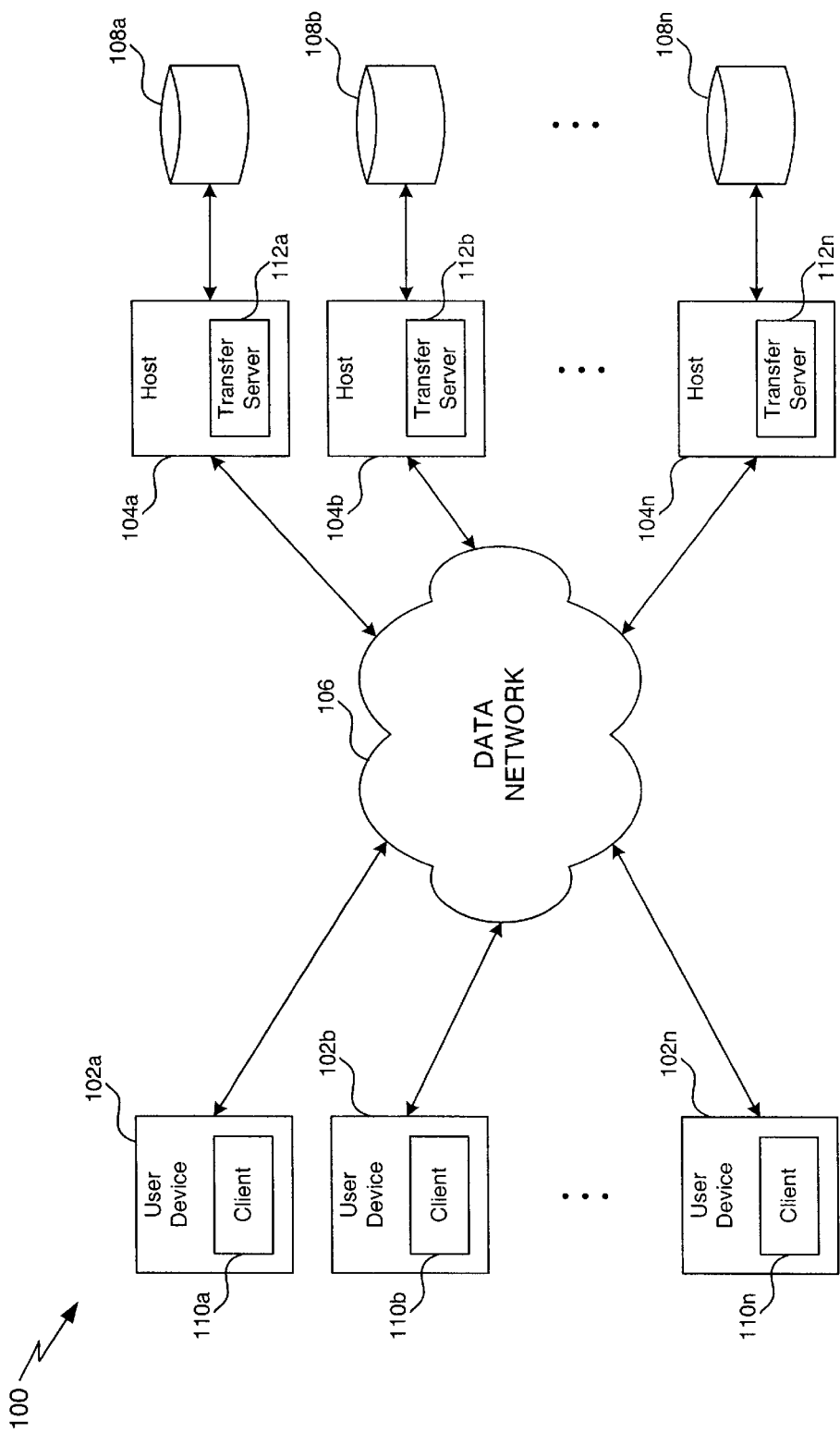
FIG. 1 depicts an example data network environment in which embodiments of the present invention may operate.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview of the Invention

Embodiments of the present invention monitor host resources by preventing one or more host resource limits, set by a system administrator or by the host itself, from being exceeded. When a host resource limit is reached, embodiments of the present invention initiate a queuing protocol with a client requesting data. The protocol allows the client to enter a queue and wait until such time as host resources may be allocated to service the data request. The queue is maintained by the host, which may provide periodic updates to the client regarding queue length, position and estimated wait time. Clients may advance through the queue in accordance with a first-in-first-out algorithm, or in accordance with some alternative priority scheme. When a client reaches the head of the queue, host resources are checked to determine if sufficient resources are available to service the request. If sufficient resources are available, they are allocated to the client at the head of the queue.

B. Example Operating Environment

FIG. 1 is a block diagram representing an example environment 100 in which embodiments of the present invention may operate. It should be understood that the example operating environment 100 is shown for illustrative purposes only and does not limit the invention. Other implementations of the operating environment 100 described herein will be apparent to persons skilled in the relevant art(s) based on the teachings contained herein, and the invention is directed to such other implementations.

The example operating environment 100 includes a data network 106 which connects a plurality of user devices 102a–102n to a plurality of hosts 104a–104n. The data network 106 provides a pathway for the bi-directional communication of electronic data between the user devices and the hosts. The data network 106 can comprise any type of computer network or combination of networks including, but not limited to, circuit switched and/or packet switched networks. Additionally, the data network 106 may comprise a variety of transmission mediums including, but not limited to, twisted pair, coaxial cable, fiber-optic and/or wireless transmission mediums. In an example operating environment, the data network 106 includes a wide area network such as the Internet.

Each user device 102a–102n executes a corresponding client application 110a–110n that is adapted to generate and transmit requests for electronic information to any one of the hosts 104a–104n over the data network 106. Each client 110a–110n is further adapted to receive responses as well as requested data from any of the hosts 104a–104n. In an example operating environment, each user device 102a–102n comprises a personal computer and each client 110a–110n comprises a commercially-available Web browser for requesting and receiving electronic information over the data network 106. However, this example is not limiting and each user device 102a–102n can comprise any device capable of running client applications for sending and receiving electronic information over a data network including, but not limited to, data terminal equipment, set-top boxes, Personal Digital Assistants (PDAs), cellular phones, automotive on-board computers, and the like.

Each host 104a–104n executes a corresponding transfer server program 112a–112n that is adapted to respond to client requests and provide requested data in accordance with embodiments of the present invention. In an example operating environment, each host 104a–104n comprises an Intel processor-based computer system running a Microsoft Windows or Linux operating system. As shown in FIG. 1, each host 104a through 104n is coupled to a corresponding storage device 108a through 108n for storing electronic information that may be requested by one or more clients. The storage devices 108a–108n may each comprise a memory that is internal to the host, including but not limited to a random-access memory (RAM) or a hard disk, or a memory device that is external to the host, including but not limited to an attached file server, one or more disk arrays, or a storage area network (SAN).

A variety of conventional communication protocols can be used to support communication between the clients 110a–110n and the transfer servers 112a–112n. In an example operating environment, a Transmission Control Protocol/Internet Protocol (TCP/IP) suite is used to establish links and transport data, while a Hypertext Transfer Protocol (HTTP) or File Transfer Protocol (FTP) application layer is used for client-server communication. However, these examples are illustrative. The present invention is not intended to be limited to a specific communication protocol or application, and other proprietary or non-proprietary network communication protocols and applications can be used.

Figure 2:
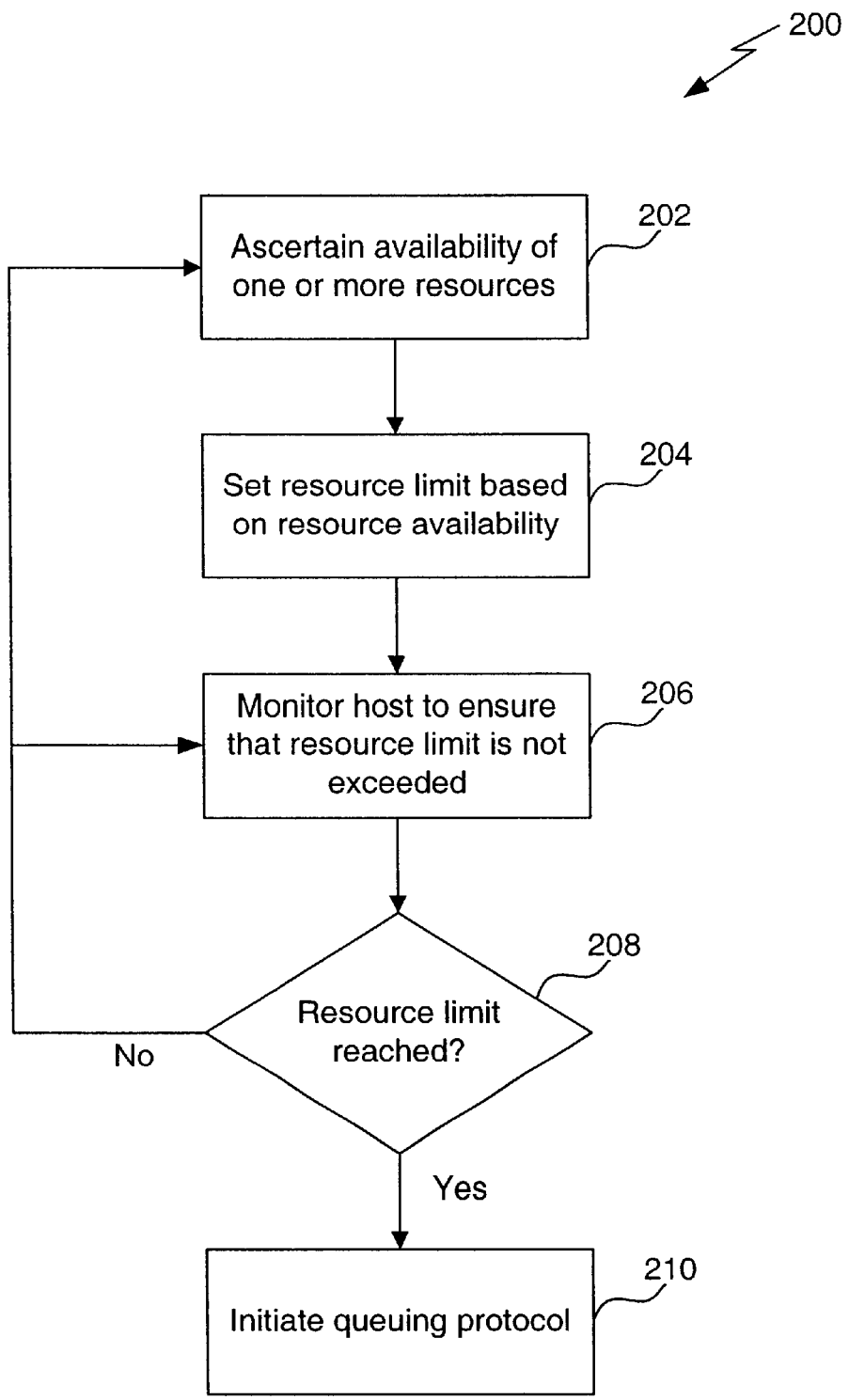
FIG. 2 is a flowchart of a method for maintaining host resources in accordance with embodiments of the present invention.

C. Maintenance of Host Resources in Accordance with Embodiments of the Present Invention In embodiments of the present invention, the resources of each host 104a through 104n are maintained so that resource exhaustion and host and/or server shutdown can be avoided in an instance where a host receives an excessive number of client data requests. FIG. 2 depicts a flowchart 200 of a method for maintaining host resources in accordance with embodiments of the present invention. The invention, however, is not limited to the description provided by the flowchart 200. Rather, it will be apparent to persons skilled in the relevant art(s) from the teachings provided herein that other functional flows are within the scope and spirit of the present invention. The flowchart 200 will be described with continued reference to the components of the example operating environment 100 described in reference to FIG. 1. However, the invention is not limited to those embodiments.

As shown in FIG. 2, the method begins at step 202 with the determination of the availability of one or more host resources. In embodiments, the host resources that are gauged include one or more of the following: available network bandwidth, host processing power (CPU), available memory, file and/or socket descriptors, and disk input/output (I/O) bandwidth. However, these examples are not limiting, and other host resources may be gauged in accordance with embodiments of the present invention.

At step 204, at least one resource limit is defined based on resource availability as determined in step 202. The resource limit may be a direct limit on any one of the resources listed above. For example, the resource limit may be a limit on the amount of network bandwidth, CPU, memory, file and/or socket descriptors, and disk I/O bandwidth that can be used by the host. Alternately, the resource limit may comprise a limit on some functionality of the host that impacts one or more host resources. For example, in embodiments, the resource limit comprises a limit on the total number of clients that are permitted to download data from the host at any one time. As will be appreciated by persons skilled in the relevant art(s), as the number of clients simultaneously downloading data from a particular host increase, one or more of the above-listed resources listed may be impacted.

In embodiments, each of steps 202 and 204 are performed by a system administrator who has access to resource information for each host 104a–104n. For example, a system administrator may ascertain the availability of one or more host resources by observing indicia of host performance. This indicia may comprise, for example, the output of a resource tracking program that is running on a particular host, or user feedback concerning the accessability and responsiveness of a particular host in relation to providing requested content. The system administrator may then set a resource limit for each host 104a–104n through a configuration process. This configuration process may comprise, for example, setting a parameter in a configuration file on each host 104a–104n that is accessible by a corresponding transfer server program 112a–112n.

In alternate embodiments, each of steps 202 and 204 are performed automatically by a program residing on each host 112a–112n. For example, steps 202 and 204 may be performed by each of the transfer server programs 112a–112n. In such embodiments, each transfer server program analyzes one or more host resource levels and then sets at least one resource limit based on this analysis.

In step 206, the host is continuously monitored to ensure that the resource limit defined in step 204 is not exceeded. As shown in steps 208 and 210, when the resource limit is reached, the host transfer server will initiate a queuing protocol that will be described in more detail below. However, as also shown at step 208, where the resource limit has not been reached, monitoring of the host resources may resume at step 206, or, alternately, the process of ascertaining resource availability and setting a resource limit may be re-initiated at step 202. In embodiments, steps 206, 208 and 210 are performed by each of the transfer server programs 112a–112n depicted in FIG. 1 for the purpose of maintaining host resource levels.

D. Queuing System and Method for Network Data Transfer in Accordance with Embodiments of the Present Invention As will be discussed in more detail herein, in accordance with embodiments of the present invention, each transfer server 112a–112n maintains a queue for storing an identification of clients currently waiting to access requested data. The maintenance of the queue ensures that host resources are not exhausted and host resource limitations are handled in a manner that is as pleasing as possible to client users. The maintenance of the queue also permits a host or system administrator to determine the number of clients that are currently waiting for data. In embodiments, each transfer server 112a–112n maintains a queue in host memory, such as in storage devices 108a–108n, or in some alternate host memory space.

Figure 3:
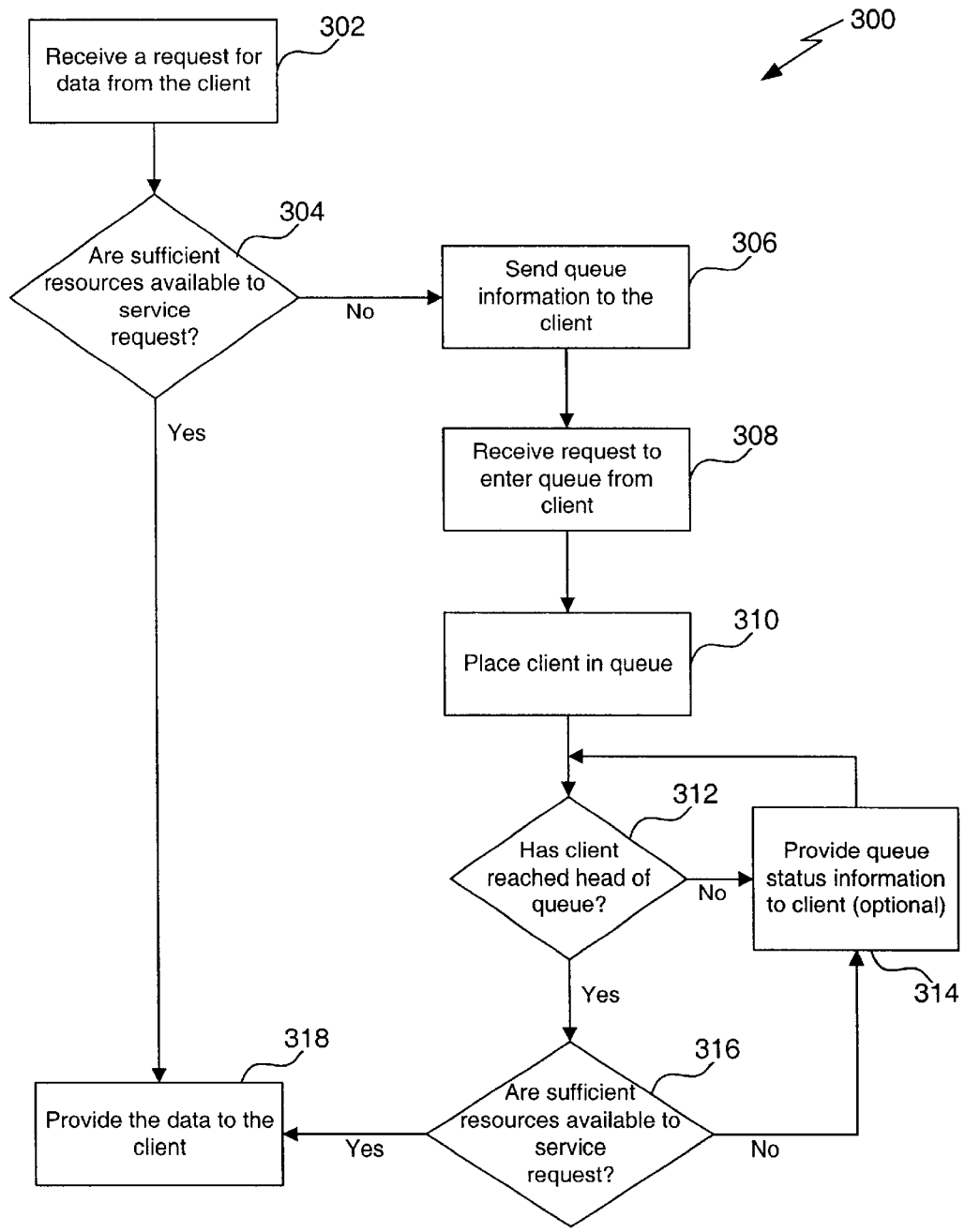
FIG. 3 is a flowchart of a method for transferring electronic data over a network in accordance with embodiments of the present invention.

The flowchart 300 of FIG. 3 depicts a server-based perspective of a queuing method for transferring electronic data over a network in accordance with embodiments of the present invention. The invention, however, is not limited to the description provided by the flowchart 300. Rather, it will be apparent to persons skilled in the relevant art(s) from the teachings provided herein that other functional flows are within the scope and spirit of the present invention. In embodiments, the steps of the flowchart 300 are performed by each of the transfer server programs 112a–112n and the flowchart will be described with reference to such embodiments. However, the invention is not so limited, and the steps of the flowchart 300 may be performed by a variety of hardware components, software components, or a combination of hardware and software components residing on each host 104a–104n.

At step 302, the transfer server receives a request for data from a client, such as one of the clients 102a–102n. In embodiments, the request comprises an HTTP request and the requested data comprises a file of electronic information.

At step 304, the transfer server determines if sufficient resources are available to service the request. In embodiments, the transfer server determines if sufficient resources are available to service the request by determining if a pre-configured host resource limit has been reached, such as the resource limit set by the host in step 204 of flowchart 200, as described above in reference to FIG. 2. For example, in an embodiment, the transfer server determines if a pre-configured number of active client connections has been reached, wherein an active client connection is defined as a connection in which a client is downloading requested data.

If the transfer server determines that there are sufficient resources to service the request, then it provides the requested data to the client as shown at step 318. For example, if the transfer server determines that the number of active client connections has not reached a pre-configured limit, then it provides the requested data to the client and the number of active connections is incremented by one. In embodiments, requested data may be provided to the client by sending an HTTP reply to the client that contains a link to the requested content. The client user would then click on the link to generate an authorized HTTP request for accessing the data.

However, if the transfer server determines that there are insufficient resources to service the request, it sends queue information to the client, as shown at step 306. As discussed above, in embodiments of the present invention, the transfer server maintains a queue of clients that have requested data but have not yet been permitted to access the data. The queue information sent to the client may include the current length of the queue and the estimated wait time should the client enter the queue. In embodiments, the transfer server sends the queue information in an HTML document encapsulated within an HTTP reply for display by the client. In further embodiments, the HTML document containing the queue information also contains a link that, when executed by the client user, generates an HTTP request to the transfer server to enter the client in the queue.

Figure 6:
FIG. 6 depicts an example HTML-based display for providing queue information and generating a client request to enter a queue in accordance with embodiments of the present invention.

For example, FIG. 6 depicts an example HTML-based display 600 for providing queue information and generating a client request to enter a queue in accordance with embodiments of the present invention. As shown in the example display 600, the queue information includes a first text portion 602 directed to the number of active client connections, a second text portion 604 directed to the number of clients currently in the queue, and a third text portion 606 directed to the estimated wait time in the queue. The example display 600 also includes a link button 610 that, when activated by the client user, generates an HTTP request to the transfer server to enter the client in the queue and a cancellation button 608 that, when activated, closes the window 600 and thereby terminates the queuing protocol.

At step 308, the transfer server receives a request from the client to enter the queue. In embodiments, the request to enter the queue comprises an HTTP request generated, for example, when the client user executes a designated link, as discussed immediately above.

At step 310, the transfer server places the client in the queue. For the purposes of this description, the term "placing the client in the queue" refers to storing a unique identifier corresponding to the client data request in a queue in host memory. In an embodiment, the unique identifier comprises a random number generated by the transfer server that corresponds to the client request. In an alternate embodiment, the unique identifier comprises the client data request itself. In another alternate embodiment, the unique identifier comprises a network address for the client or user device on which the client resides. However, these examples are not limiting, and any unique identifier may be used. Where the unique identifier does not include the original client data request, the transfer server may store the client data request in host memory or retrieve the request from the client at a later point in time for processing purposes.

Once the client is in the queue, it advances through the queue in a first-in-first-out fashion as resources are liberated the by host and allocated to a client at the head of the queue. When a client at the head of the queue is allocated host resources, it is removed from the queue. For example, in embodiments, when an active client connection is terminated (e.g., a client completes a download of requested data), the total number of active client connections is decreased by one. When the number of active client connections drops below the pre-configured limit, the client at the beginning of the queue is allocated an active client connection and every other client in the queue moves one place forward.

While the client is waiting in the queue, the server may optionally provide queue status information to the client on a periodic basis, as shown at step 314. This queue status information may comprise an updated position of the client in the queue, an updated total number of clients in the queue, as well as an updated estimated wait time for the client. Example methods for determining estimated client wait time are discussed below with reference to FIGS. 5A and 5B. In embodiments, the transfer server provides the queue status information in an HTML document encapsulated within an HTTP reply for display by the client.

Figure 7:
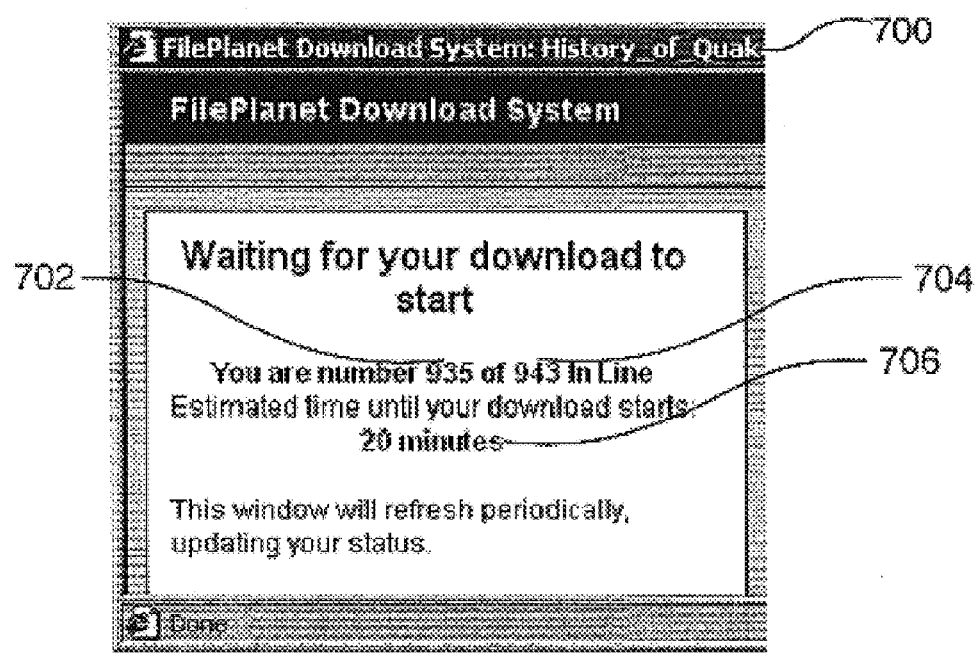
FIG. 7 depicts an example HTML-based display for providing queue status information in accordance with embodiments of the present invention.

For example, FIG. 7 depicts an example HTML-based display for providing queue status information in accordance with embodiments of the present invention. As shown in the example display 700, the queue information includes a first text portion 702 directed to the client position in the queue, a second text portion 704 directed to the total number of clients currently in the queue, and a third text portion 706 directed to the estimated wait time in the queue.

When the client has reached the head of the queue, the transfer server again determines if there are sufficient resources available to service the data request, as shown at steps 312 and 316. If the transfer server determines that there are sufficient resources available to service the client data request, then it removes the client from the queue and provides the data to the client as shown at step 318. For example, if the transfer server determines that the number of active client connections has dropped below a pre-configured limit, then it provides the requested data to the client and the number of active client connections is incremented by one. In embodiments, requested data may be provided to the client by sending an HTTP reply to the client that contains a link to the requested content. The client user would then click on the link to generate an authorized HTTP request for accessing the data.

Figure 8:
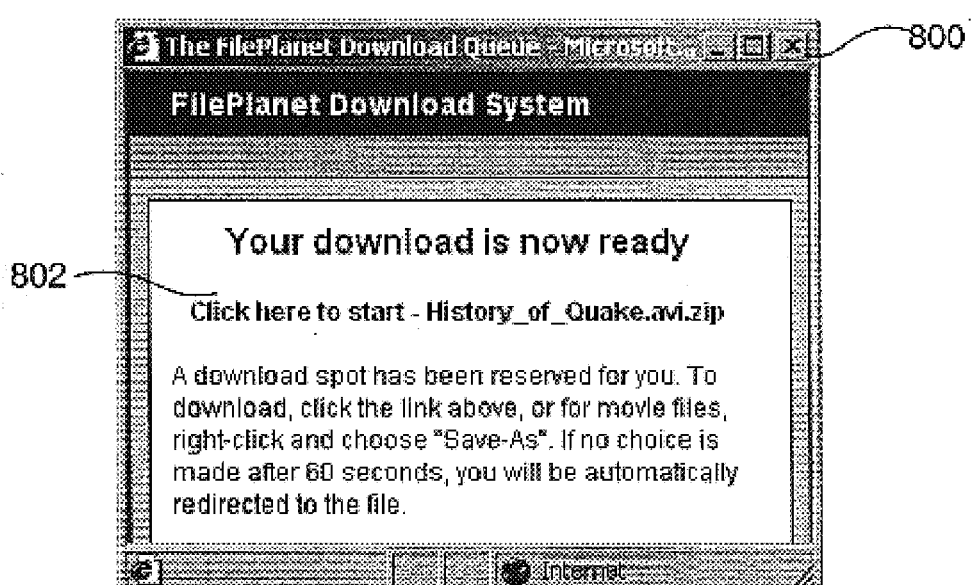
FIG. 8 depicts an example HTML-based display for providing requested data to a client in accordance with embodiments of the present invention.

FIG. 8 depicts an example HTML-based display 800 for providing requested data to a client in accordance with embodiments of the present invention. As shown in the example display 800, a link 802 is provided that, when executed by the client user, generates an authorized HTTP request to access the data from the host.

However, if the transfer server determines that there are insufficient resources available, then the transfer server keeps the client in the queue and optionally continues to provide queue status information to the client, as shown at step 314.

Figure 4:
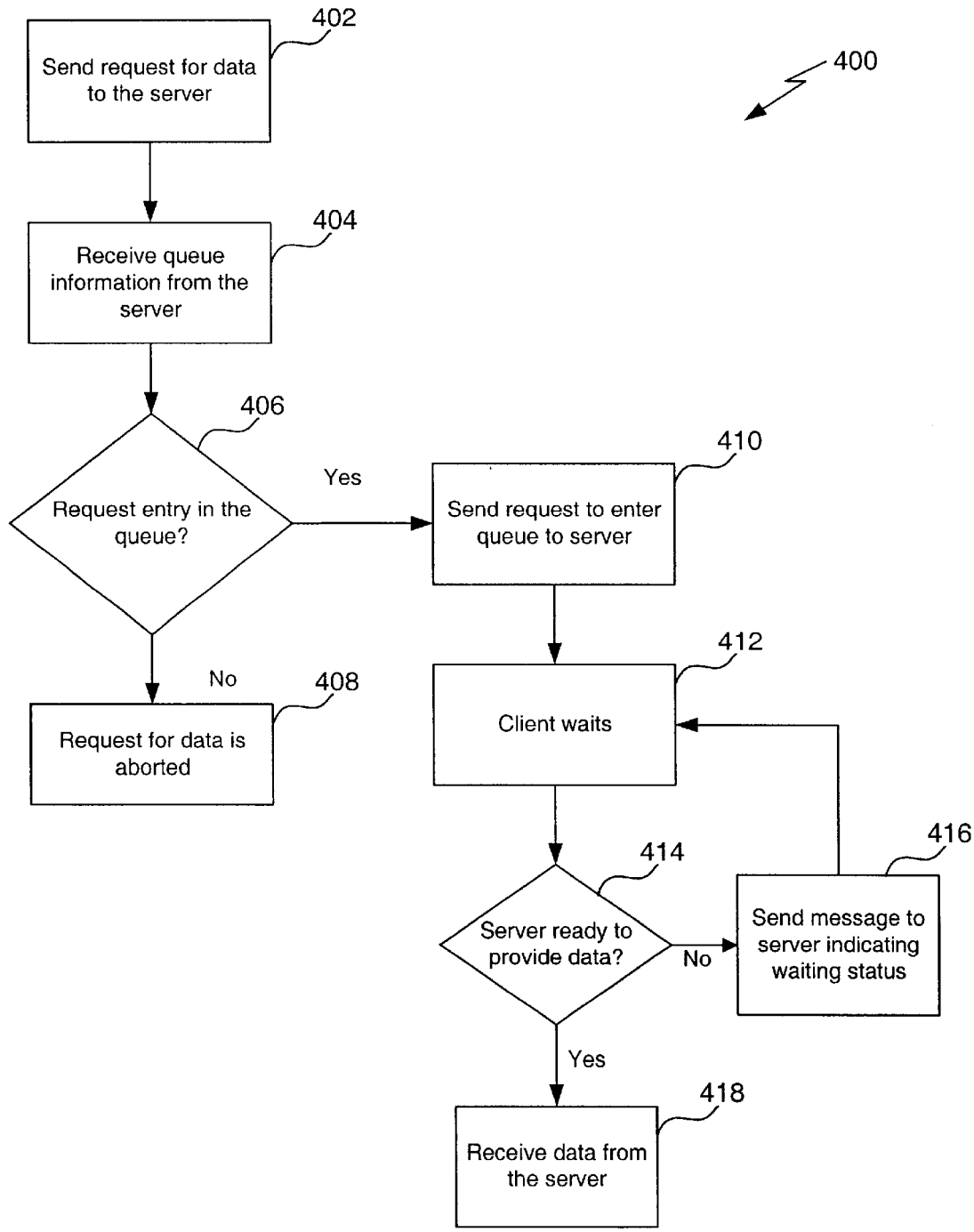
FIG. 4 is a flowchart of a method for transferring electronic data over a network in accordance with embodiments of the present invention.

The flowchart 400 of FIG. 4 presents a client-based perspective of a queuing method for transferring electronic data over a network in accordance with embodiments of the present invention. The invention, however, is not limited to the description provided by the flowchart 400. Rather, it will be apparent to persons skilled in the relevant art(s) from the teachings provided herein that other functional flows are within the scope and spirit of the present invention. In embodiments, the steps of the flowchart 400 are performed by a client application, such as one of the client applications 110a–110n residing on corresponding user devices 102a–102n. However, the invention is not so limited, and the steps of the flowchart 400 may be performed by a variety of hardware components, software components, or a combination of hardware and software components residing on each user device 110a–110n.

At step 402, the client sends a request for data to a server, such as any one of the transfer servers 112a–112n. In embodiments, the request for data comprises an HTTP request and the requested data comprises a file of electronic information.

At step 404, the client receives queue information from the server. The queue information received by the client may include the current length of the queue and the estimated wait time should the client enter the queue. In embodiments, the queue information is received by the client in an HTML document encapsulated within an HTTP reply for display purposes. In further embodiments, the HTML document containing the queue information also contains a link that, when executed by the client user, generates an HTTP request to the server to enter the client in the queue. As discussed above, FIG. 6 depicts an example HTML-based display 600 for providing queue information and generating a client request to enter a queue in accordance with embodiments of the present invention.

If the client chooses to be entered in the queue, the client generates a request to enter the queue and sends it to the server, as shown at steps 406 and 410. With reference to the example HTML-based display 600, the client user would activate the link button 606 in order to generate this request. However, if the client user chooses not to enter the queue, then the original data request is aborted, as shown at steps 406 and 408. With further reference to the example display 600, the client user would activate the cancellation button 608 in order to close the window 600, thereby terminating the queuing protocol.

Once the client has entered the queue it must wait until the server is ready to provide data, as shown at step 412. In embodiments, while the client is waiting in the queue, it sends status messages to the server on a periodic basis to indicate that it is still waiting for the requested data, as shown at step 416. The purpose of sending these messages is to let the server know that the client is still "alive." When a client fails to provide a scheduled status message, it may be removed from the queue, thereby freeing up space in the queue soon after a connection with a client is lost. In an embodiment, each periodic status message comprises an HTTP message that includes the original client data request. In a further embodiment, the periodic status messages are sent by the client approximately every 60 seconds and the server removes the client from the queue if a status message is not received for a period of 90 seconds.

Also, as discussed above, while the client is waiting in the queue, it may receive messages from the server regarding queue status on a periodic basis (not shown in FIG. 4). This queue status information may comprise an updated position of the client in the queue, an updated total number of clients in the queue, as well as an updated estimated wait time for the client. In embodiments, the queue status information is received by the client in an HTML document encapsulated within an HTTP reply for display purposes. As further discussed above, FIG. 7 depicts an example HTML-based display for providing queue status information in accordance with embodiments of the present invention.

At shown at steps 414 and 418, the client receives the requested data only when the server has determined that it is ready to provide it. In embodiments, requested data may be received by the client by receiving an HTTP reply from the server that contains a link to the requested content. The client user would then click on the link to generate an authorized HTTP request for accessing the data. As discussed above, FIG. 8 depicts an example HTML-based display 800 for providing requested data to a client in accordance with embodiments of the present invention. As shown in the example display 800, a link 802 is provided that, when executed by the client user, generates an authorized HTTP request to access the data from the host.

1. Estimating Client Wait Time

As discussed above, in accordance with embodiments of the present invention, a host provides queue information in response to a client data request or as part of a queue status message, wherein the queue information includes an estimated client wait time in the queue. As will be appreciated by persons skilled in the relevant art(s), a number of techniques may be used to estimate client wait time in a queue.

Figure 5A:
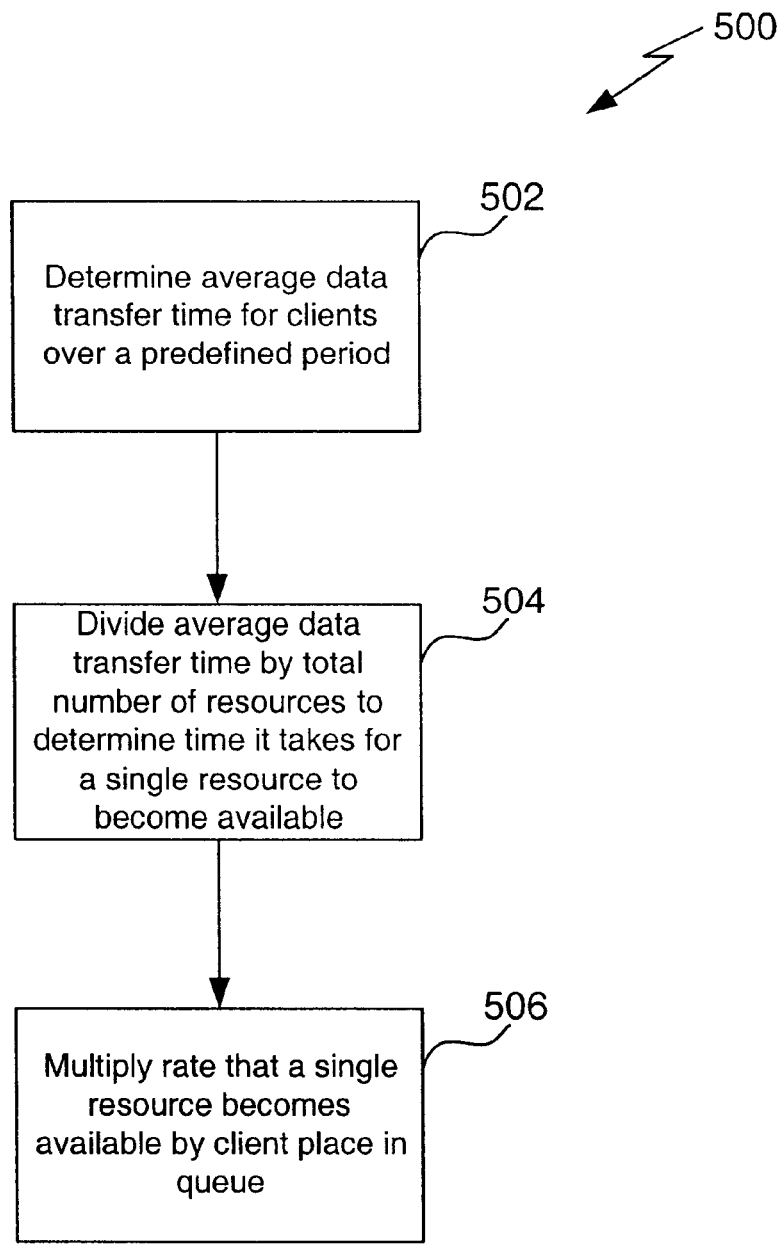
FIG. 5A is a flowchart of a method for estimating client wait time in a queue in accordance with embodiments of the present invention.

FIG. 5A depicts a flowchart 500 of a method for estimating client wait time in a queue. The invention, however, is not limited to the description provided by the flowchart 500. Rather, it will be apparent to persons skilled in the relevant art(s) from the teachings provided herein that other functional flows are within the scope and spirit of the present invention.

As shown at step 502, the method begins by determining a historical average data transfer time for clients over a predefined time period. For example, a historical average data transfer time is calculated by adding up the individual download times for each client that has completed a data transfer over a predefined period of time (e.g., the past hour) to determine a total download time. The total download time is then divided by the total number of clients that have completed data transfers over the predefined time period to determine the average data transfer time.

As shown at step 504, the average data transfer time determined in step 502 is then divided by the total number of available resources to calculate the amount of time it takes a single resource to become available. For example, in embodiments, the average data transfer time is divided by the total allowable number of active client connections to determine the amount of time it takes for a single active client connection to become available.

As shown at step 506, the time it takes for a single resource to become available as determined in step 504 is then multiplied by a current or anticipated client queue position to determine an estimated wait time in the queue for that client. For example, in embodiments, the time it takes for a single active client connection to become available is multiplied by a current or anticipated client queue position to determine an estimated wait time in the queue for that client.

The method of flowchart 500 will now be demonstrated in relation to a specific example. The example will assume that the host permits 500 active client connections at a time, and that an estimated wait time is being determined for a client in the 40th position in the queue. In accordance with step 502, an average download time is determined over a predetermined period of time; the example will assume that the average download time is 10 minutes (600 seconds). In accordance with step 504, the average download time of 600 seconds is divided by the total number of active client connections, 500, to calculate a time of 1.2 seconds for a single active client connection to become available. In accordance with step 506, the time it takes for a single active client connection to become available, 1.2 seconds, is multiplied by the client queue position, 40, to yield an estimated wait time for the client of 48 seconds.

Figure 5B:
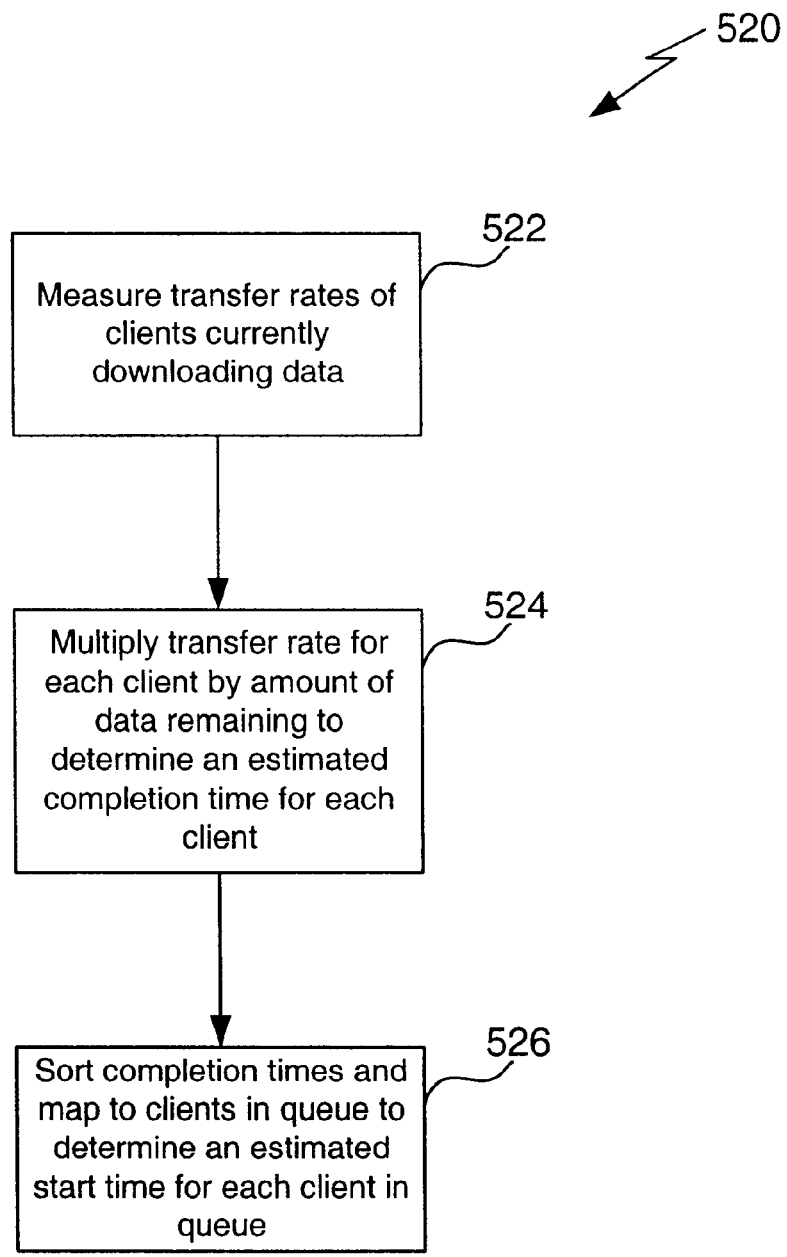
FIG. 5B is a flowchart of a method for estimating client wait time in a queue in accordance with embodiments of the present invention.

FIG. 5B depicts a flowchart 520 of an alternate method for estimating client wait time in a queue. The invention, however, is not limited to the description provided by the flowchart 520. Rather, it will be apparent to persons skilled in the relevant art(s) from the teachings provided herein that other functional flows are within the scope and spirit of the present invention.

At shown at step 522, the method begins by measuring the current transfer rate of all clients currently downloading data.

At shown at step 524, the transfer rate determined for each client in step 522 is multiplied by the amount of data remaining to be downloaded for each client. This provides an estimated completion time for each client currently downloading data.

At shown at step 526, the estimated completion time for each client currently downloading data is sorted by length and then mapped to client positions in the queue. For example, the shortest estimated completion time would be mapped to the first position in the queue, the second shortest estimated completion time would be mapped to the second position in the queue, and so on, until each client in the queue has been matched to an estimated completion time. The estimated completion time assigned to a client in the queue comprises the estimated wait time for that client.

As may be seen from the above description, the method described in reference to flowchart 500 estimates wait time based on historical information related to completed data transfers, whereas the method described in reference to flowchart 520 estimates wait time based on information related to current data transfers. Because the method described in reference to flowchart 520 utilizes more current information and maps each client in the queue to a single host resource, the method described in reference to flowchart 520 can provide greater accuracy than the method described in reference to flowchart 500 when the number of clients in the queue is less than the number of clients currently downloading data. However, because the method described in reference to flowchart 520 must map each client in the queue to a single host resource, it can be less accurate than the method described in reference to flowchart 500 when the number of clients in the queue is greater than the number of available host resources. For example, the method described in reference to flowchart 520 can be less accurate when the number of clients in the queue is greater than the permissible number of active client connections.

2. Alternate Queuing Algorithms

As discussed above, in embodiments of the present invention, clients are shifted through the queue in accordance with a first-in-first-out algorithm. However, as will be appreciated by persons skilled in the relevant art(s), in alternate embodiments of the invention, clients may be shifted through the queue in accordance with other priority schemes. For example, in embodiments, clients with a "preferred" status may automatically be moved ahead of clients in the queue that do not have a "preferred" status. Alternately, a transfer server in accordance with embodiments of the present invention may maintain two distinct queues: a preferred queue for queuing preferred clients in a first-in-first-out fashion and a non-preferred queue for queuing non-preferred clients in a first-in-first-out fashion. In such an embodiment, clients waiting in the preferred queue will always be allocated system resources before clients waiting in the non-preferred queue. In still further embodiments, additional queues can be maintained to service three or more priority levels.

By granting certain clients priority over other clients, embodiments of the present invention permit a host operator to distinguish preferred customers from non-preferred customers. This can be useful for generating revenue in the case where users must pay to obtain a preferred status. Alternately, providing a preferred status to registered client users can engender user loyalty and goodwill towards the content provider.

Whether a client has a preferred status may be determined by the host via a variety of known authentication systems, including but not limited to password-based and/or cookie-based authentication systems. In embodiments, when a preferred client is detected, all host download links provided to the preferred client are adapted to generate HTTP requests that indicate the preferred status of the client. The host may then receive the data request, detect the preferred status of the client, and allocate host resources accordingly.

3. Host/Server Differentiation

A transfer server in accordance with embodiments of the present invention is adapted to run on a single host machine. However, as shown in the example operating environment 100 of FIG. 1, in embodiments of the present invention, each of a plurality of host machines may be configured to run a separate instance of a transfer server. Such a configuration may be desirable to increase the overall amount of host resources available to service client data requests. For example, whereas a single host may be limited to 100 Megabits per second (Mbps) of network bandwidth for the purposes of receiving and servicing client requests, three similarly configured hosts may provide 300 Mbps of network bandwidth.

Additionally, a multiple hosts/transfer server configuration may be used to provide different content from different host machines. For example, with reference to the example operating environment 100 of FIG. 1, each host/transfer server may provide a different set of content to clients on the data network 106. Distribution of content among hosts in this manner may achieve a desired load balancing effect. Furthermore, where a host operator wants certain type of content to be more readily accessible than another type of content, the host operator can assign that content to the host machine with the most available resources.

A multiple host/transfer server configuration may further be used to provide different levels of service to different clients. For example, clients that have a "preferred" status may be permitted to access a host with more available resources than other host machines. Thus, in accordance with the queuing protocols discussed above, clients with a preferred status may experience shorter and faster queues than clients who do not have a preferred status.

Figure 9:
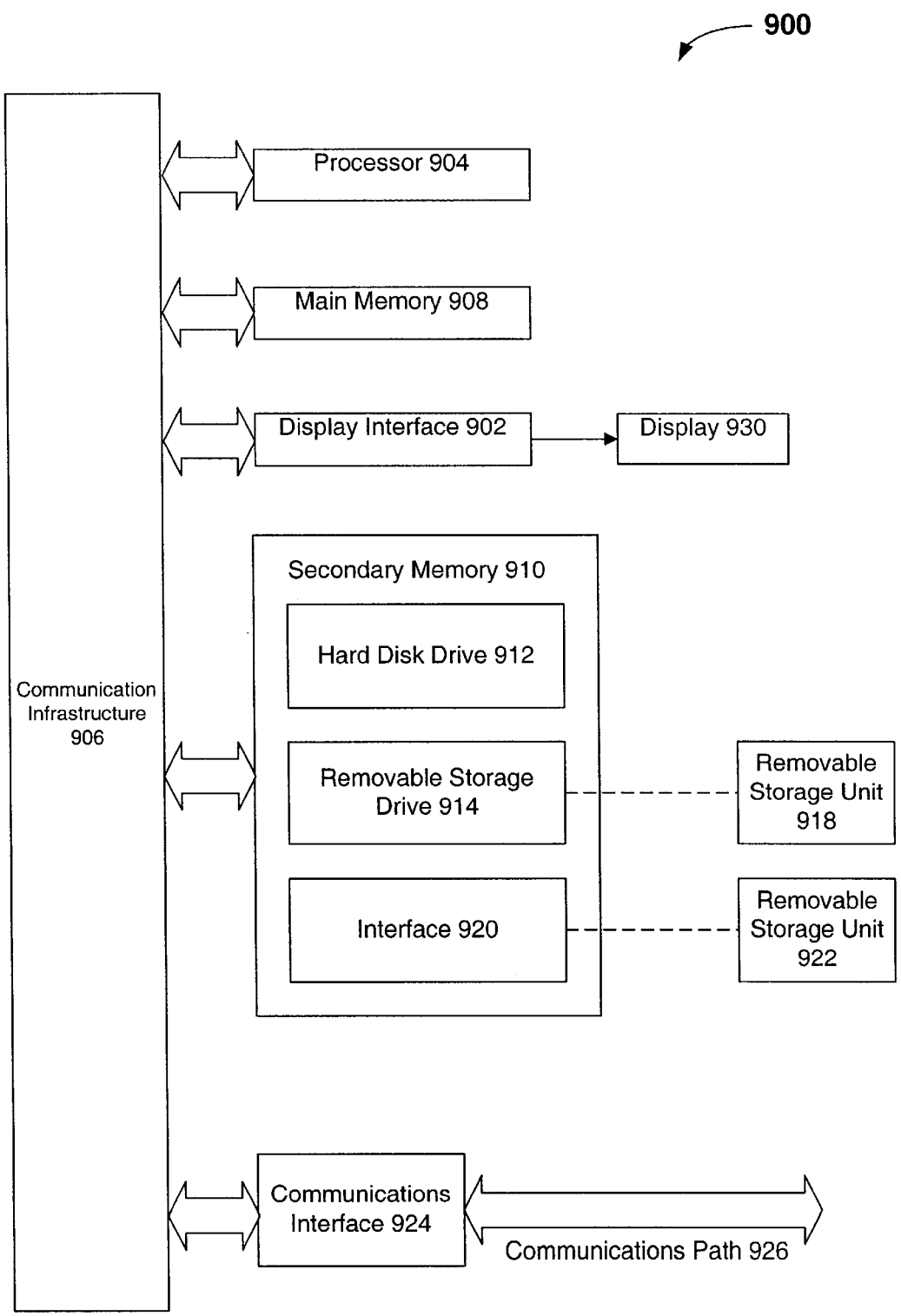
FIG. 9 illustrates an example computer system for requesting and receiving data over a network in accordance with embodiments of the present invention.

E. Example Computer System Implementation in Accordance with Embodiments of the Present Invention Client and server embodiments of the present invention can be implemented using hardware, software, or a combination thereof and may be implemented in one or more computer systems or other processing systems. FIG. 9 depicts an example computer system 900 that may be utilized to implement embodiments of the present invention. For example, the computer system 900 may be utilized to implement the resource maintenance and queuing protocols of the present invention.

As shown in FIG. 9, the example computer system 900 includes a processor 904 for executing software routines in accordance with embodiments of the present invention. Although a single processor is shown for the sake of clarity, the computer system 900 may also comprise a multi-processor system. The processor 904 is connected to a communication infrastructure 906 for communication with other components of the computer system 900. The communication infrastructure 906 may comprise, for example, a communications bus, cross-bar, or network.

Computer system 900 further includes a main memory 908, such as a random access memory (RAM), and a secondary memory 910. The secondary memory 910 may include, for example, a hard disk drive 912 and/or a removable storage drive 914, which may comprise a floppy disk drive, a magnetic tape drive, an optical disk drive, or the like. The removable storage drive 914 breads from and/or writes to a removable storage unit 918 in a well known manner. Removable storage unit 918 may comprise a floppy disk, magnetic tape, drive 914. As will be appreciated by persons skilled in the art, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of a removable storage unit 922 and interface 920 include a program cartridge and cartridge interface (such as that found in video game console devices), a removable memory chip (such as an EPROM, or PROM) and associated socket, and other removable storage units 922 and interfaces 920 which allow software and data to be transferred from the removable storage unit 922 to computer system 900.

Computer system 900 further includes a display interface 902 that forwards graphics, text, and other data from the communication infrastructure 906 or from a frame buffer (not shown) for display to a user on a display unit 930.

Computer system 900 also includes a communication interface 924. Communication interface 924 allows software and data to be transferred between computer system 900 and external devices via a communication path 926. In embodiments of the present invention, the communication interface 924 permits data to be transferred between the computer system 900 and a data network, such as data network 106. Examples of communications interface 924 can include a modem, a network interface (such as Ethernet card), a communications port, and the like. Software and data transferred via communications interface 924 are in the form of signals which can be electronic, electromagnetic, optical or other signals capable of being received by communications interface 924. These signals are provided to the communications interface via the communication path 926.

As used herein, the term "computer program product" may refer, in part, to removable storage unit 918, removable storage unit 922, a hard disk installed in hard disk drive 912, or a carrier wave carrying software over a communication path 926 (wireless link or cable) to communication interface 924. A computer useable medium can include magnetic media, optical media, or other recordable media, or media that transmits a carrier wave or other signal. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform features of the present invention. Accordingly, such computer programs represent controllers of the computer system 900.

The present invention can be implemented as control logic in software, firmware, hardware or any combination thereof. In an embodiment where the invention is implemented using software, the software may be stored in a computer program product and loaded into computer system 900 using removable storage drive 914, hard disk drive 912, or interface 920. Alternatively, the computer program product may be downloaded to computer system 900 over communications path 926. The software, when executed by the processor 904, causes the processor 904 to perform functions of the invention as described herein.

F. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a network host for managing the delivery of data files over a network, comprising:

(a) receiving, from a client, a first Hypertext Transfer Protocol (HTTP) request for a data file;

(b) determining if sufficient resources are available to service said first HTTP request;

(c) if sufficient resources are available to service said first HTTP request, providing an HTTP reply to said client, wherein said HTTP reply includes a link to said data file; and (d) if sufficient resources are not available to service said first HTTP request, then:

(i) sending to said client an HTTP message offering entry into a queue, wherein said HTTP message includes a HyperText Markup Language (HTML) document providing queue information and a link for generating a second HTTP request to enter said queue, (ii) receiving from said client said second HTTP request to enter said queue, (iii) storing an identifier corresponding to said first HTTP request in a queue maintained by the host in a memory, and (iv) providing an HTTP reply to said client, wherein said HTTP reply includes a link to said data file, when said identifier reaches a predetermined position in said queue.

2. The method of claim 1, further comprising:

notifying said client, while said identifier is in said queue, of wait status.

3. The method of claim 2, wherein said notifying step comprises:
notifying said client, while said identifier is in said queue, of wait status, wherein said wait status includes an estimated wait time and a queue position.

4. The method of claim 1, further comprising:
advancing a position of said identifier in said queue in accordance with a first-in-first-out algorithm.

5. The method of claim 1, further comprising:
receiving periodic HTTP messages from said client, while said identifier is in said queue, said periodic HTTP messages indicating that said client is still waiting for said data file, and
removing said identifier from said queue if a periodic HTTP message is not received by a predetermined time.

6. The method of claim 1, wherein said step of providing an HTTP reply to said client when said identifier reaches a predetermined position in said queue comprises:
providing said HTTP reply to said client when said identifier reaches a front of said queue and sufficient resources are available to service said first HTTP request.

7. The method of claim 1, further comprising:
ascertaining an availability of at least one resource; and
setting a resource limit based on said availability of said at least one resource;
wherein said determining step comprises determining if said resource limit has been reached.

8. The method of claim 7, wherein said at least one resource is network bandwidth, processing power, memory, file descriptors, socket descriptors, or disk input/output bandwidth.

9. The method of claim 7, wherein said resource limit is a limit on a total number of client connections for downloading data.

10. A method in a network host for managing the delivery of data files over a network, comprising:
(a) receiving, from a client, a first Hypertext Transfer Protocol (HTTP) request for a data file;
(b) determining if a number of active client connections has reached a predefined limit;
(c) if said number of active client connections has not reached said predefined limit, providing an HTTP reply to said client, wherein said HTTP reply includes a link to said data file; and
(d) if said number of active client connections has reached said predefined limit, then
(i) sending to said client an HTTP message offering entry into a queue, wherein said HTTP message includes a HyperText Markup Language (HTML) document providing queue information and a link for generating a second HTTP request to enter said queue,
(ii) receiving from said client said second HTTP request to enter said queue,
(iii) storing an identifier corresponding to said first HTTP request in a queue maintained by the host in a memory, and
(iv) providing an HTTP reply to said client, wherein said HTTP reply includes a link to said data file, when said identifier reaches a predetermined position in said queue.

11. The method of claim 10, further comprising:
notifying said client, while said identifier is in said queue, of wait status.

12. The method of claim 11, wherein said notifying step comprises:
notifying said client, while said identifier is in said queue, of wait status, wherein said wait status includes an estimated wait time and queue position.

13. The method of claim 10, further comprising:
advancing a position of said identifier in said queue in accordance with a first-in-first-out algorithm.

14. The method of claim 10, further comprising:
receiving periodic HTTP messages from said client, while said identifier is in said queue, said periodic HTTP messages indicating that said client is still waiting for said data file, and
removing said identifier from said queue if a periodic HTTP message is not received by a predetermined time.

15. The method of claim 10, wherein said step of providing said HTTP reply to said client when said identifier reaches a predetermined position in said queue comprises:
providing said HTTP reply to said client when said identifier reaches a front of said queue and said number of active client connections drops below said predefined limit.

16. The method of claim 10, further comprising:
ascertaining an availability of at least one resource; and
setting said predefined limit on said number of active client connections based on said availability of said at least one resource.

17. The method of claim 16, wherein said at least one resource is network bandwidth, processing power, memory, file descriptors, socket descriptors, or disk input/output bandwidth.

18. A computer program product comprising a computer useable medium having computer program logic recorded thereon for enabling a processor in a network host to manage the delivery of data files over a network, said computer program logic comprising:
(a) means for enabling the processor to receive, from a client, a first Hypertext Transfer Protocol (HTTP) request for a data file;
(b) means for enabling the processor to determine if sufficient resources are available to service said first HTTP request;
(c) means for enabling the processor to provide an HTTP reply to said client, said HTTP reply including a link to said data file, if sufficient resources are available to service said request; and
(d) means for enabling the processor to (i) send to said client an HTTP message offering entry into a queue, wherein said HTTP message includes a HyperText Markup Language (HTML) document providing queue information and a link for generating a second HTTP request to enter said queue, (ii) receive from said client said second HTTP request to enter said queue, (iii) store an identifier corresponding to said first HTTP request in a queue maintained by the host in a memory, and (iv) provide an HTTP reply to said client, wherein said HTTP reply includes a link to said data file, when said identifier reaches a predetermined position in said queue, if sufficient resources are not available to service said request.

19. The computer program product of claim 18, further comprising:
means for enabling the processor to notify said client, while said identifier is in said queue, of wait status.

20. The computer program product of clam 19, wherein said means for enabling the processor to notify said client, while said identifier is in said queue, of wait status comprises:

means for enabling the processor to notify said client, while said identifier is in said queue, of wait status, wherein said wait status includes an estimated wait time and a queue position.

21. The computer program product of claim 18, further comprising:

means for enabling the processor to advance a position of said identifier in said queue in accordance with a first-in-first-out algorithm.

22. The computer program product of claim 18, further comprising:

means for enabling the processor to receive periodic HTTP messages from said client, while said identifier is in said queue, said periodic HTTP messages indicating that said client is still waiting for said data file, and means for enabling the processor to remove said identifier from said queue if a periodic HTTP message is not received by a predetermined time.

23. The computer program product of claim 18, wherein said means for enabling the processor to provide an HTTP reply to said client when said identifier reaches a predetermined position in said queue comprises:

means for enabling the processor to provide an HTTP reply to said client when said identifier reaches a front of said queue and sufficient resources are available to service said request.

24. The computer program product of claim 18, further comprising:

means for enabling the processor to ascertain an availability of at least one resource; and means for enabling the processor to set a resource limit based on said availability of said at least one resource;

wherein said means for enabling the processor to determine if sufficient resources are available to service said first HTTP request comprises means for enabling the processor to determine if said resource limit has been reached.

25. The computer program product of claim 24, wherein said means for enabling the processor to ascertain an availability of at least one resource comprises means for enabling the processor to ascertain an availability of at least one of network bandwidth, processing power, memory, file descriptors, socket descriptors, or disk input/output bandwidth.

26. The computer program product of claim 24, wherein said means for enabling the processor to set a resource limit based on said availability of said at least one resource comprises means for enabling the processor to set a limit on a total number of client connections for downloading data.

27. A computer program product comprising a computer useable medium having computer program logic recorded thereon for enabling a processor in a network host to manage the delivery of data files over a network, said computer program logic comprising:

(a) means for enabling the processor to receive, from a client, a first Hypertext Transfer Protocol (HTTP) request for a data file;

(b) means for enabling the processor to determine if a number of active client connections has reached a predefined limit;

(c) means for enabling the processor to provide an HTTP reply to said client, said HTTP reply including a link to said data file, if said number of active client connections has not reached said predefined limit; and (d) means for enabling the processor to: (i) send to said client an HTTP message offering entry into a queue, wherein said HTTP message includes a HyperText Markup Language (HTML) document providing queue information and a link for generating a second HTTP request to enter said queue, (ii) receive from said client said second HTTP request to enter said queue, (iii) store an identifier corresponding to said first HTTP request in a queue maintained by the host in a memory, and (iv) provide an HTTP reply to said client, wherein said HTTP reply includes a link to said data file, when said identifier reaches a predetermined position in said queue, if said number of active client connections has reached said predefined limit.

28. The computer program product of claim 27, further comprising:

means for enabling the processor to notify said client, while said identifier is in said queue, of wait status.

29. The computer program product of claim 28, herein said means for enabling the processor to notify said client, while said identifier is in said queue, of wait status comprises:

means for enabling the processor to notify said client, while said identifier is in said queue, of wait status, wherein said wait status includes an estimated wait time and queue position.

30. The computer program product of claim 27, further comprising:

means for enabling the processor to advance a position of said identifier in said queue in accordance with a first-in-first-out algorithm.

31. The computer program product of claim 18, further comprising:

means for enabling the processor to receive periodic HTTP messages from said client, while said identifier is in said queue, said periodic HTTP messages indicating that said client is still waiting for said data file, and means for enabling the processor to remove said identifier from said queue if a periodic HTTP message is not received by a predetermined time.

32. The computer program product of claim 18, wherein said means for enabling the processor to provide an HTTP reply to said client when said identifier reaches a predetermined position in said queue comprises:

means for enabling the processor to provide an HTTP reply to said client when said identifier reaches a front of said queue and said number of active client connections drops below said predefined limit.

33. The computer program product of claim 18, further comprising:

means for enabling the processor to ascertain an availability of at least one resource; and means for enabling the processor to set said predefined limit on said number of active client connections based on said availability of said at least one resource.

34. The computer program product of claim 33, wherein said means for enabling the processor to ascertain an availability of at least one resource comprises means for enabling the processor to ascertain an availability of at least one of network bandwidth, processing power, memory, file descriptors, socket descriptors, or disk input/output bandwidth.

* * * * *